March 9, 1965  H. F. RAYFIELD  3,172,421
PRESSURE REGULATOR
Filed Dec. 17, 1962
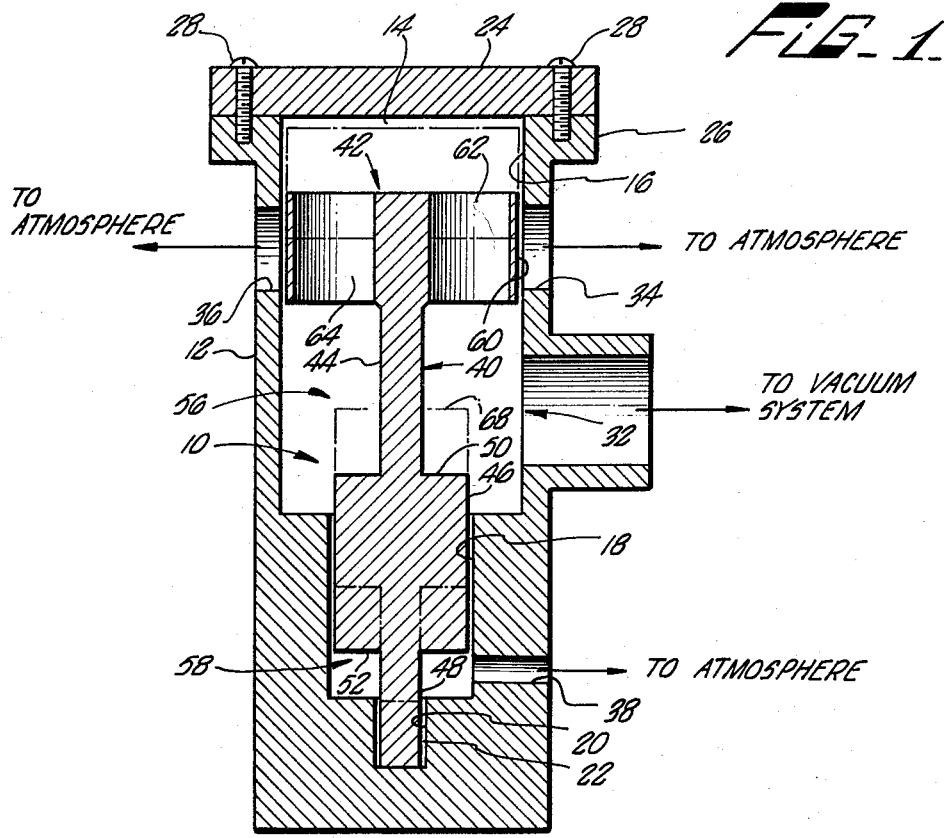
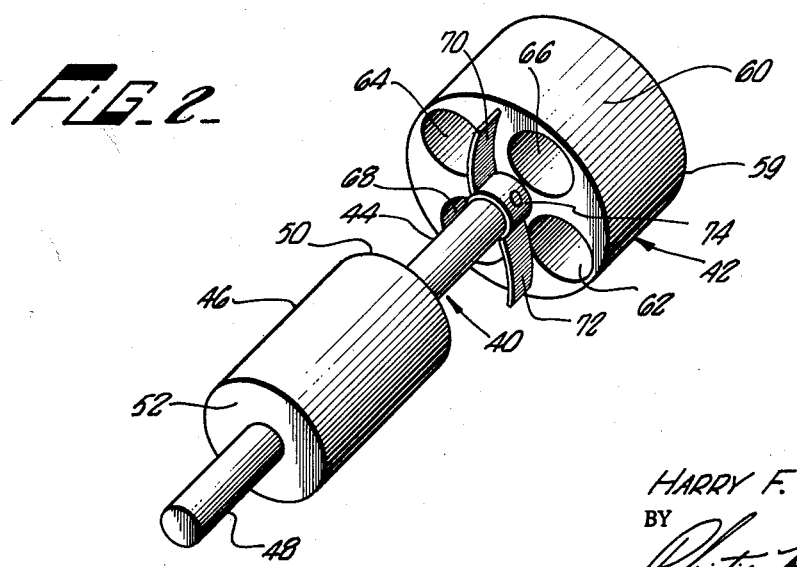
INVENTOR.
HARRY F. RAYFIELD
BY
ATTORNEYS.

United States Patent Office 3,172,421
Patented Mar. 9, 1965

3,172,421
PRESSURE REGULATOR
Harry F. Rayfield, Arcadia, Calif., assignor to Burroughs Corporation, Detroit, Mich., a corporation of Michigan
Filed Dec. 17, 1962, Ser. No. 245,251
4 Claims. (Cl. 137—332)

The present invention relates to improvements in pressure control devices and, more particularly, to a novel highly sensitive pressure regulator.

It is common practice in fluid systems, and particularly in systems which continuously supply relatively large volumes of fluid under pressure, to employ pressure regulating devices to maintain fluid pressures within the system about predetermined pressure values and within predesigned ranges of pressure. Such pressure regulators generally employ a spring loaded valve arrangement. The spring loaded valve regulates pressure within an associated system by controlling the flow of fluid between the system and a reference or constant pressure supply, such as the atmosphere, in response to differences in pressure on opposite sides of the valve. In practice, however, the spring constant of the spring loaded valve varies with age and does not provide for substantially unvarying regulation over long periods of use. Further, the fluid flow over the surface of the valve develops a turbulence which interferes with accurate pressure regulation. Moreover, the valve tends to float on the surface of the fluid passing thereover rather than being responsive to the pressure differentials thereacross. In addition, spring loaded valve arrangements are relatively insensitive to small pressure differences.

In view of the above, the present invention provides a highly stable pressure regulator which is extremely sensitive even to small pressure differences and which is not adversely affected by controlled fluid flow between a reference pressure supply and the system to be regulated.

Briefly, to accomplish this, the regulator of the present invention effectively separates the regulatory and valving portions of the over-all regulator design such that valve operation does not depend upon the differential pressure thereacross but rather on pressure changes in an associated pressure system as detected by a gravity referenced regulator arrangement coupled to the valving apparatus.

More particularly, the present invention in a basic form, includes a piston member of predetermined weight mounted for substantially vertical movement within a pressure chamber which communicates both with the system to be regulated and a reference pressure supply, such as the atmosphere. The outer dimensions of the piston are slightly less than adjacent inner dinmensions of the chamber such that small amounts of fluid continuously pass over the surfaces of the piston member to produce an effective fluid-bearing contact between the piston member and the walls of the chamber. One end of the piston is enlarged and arranged to have fluid from the system and the reference supply continuously act in opposite directions upon its upper and lower surfaces. An opposite end of the piston member is arranged to provide a low force valve for controlling the volume of fluid passing between the reference supply and the system in response to vertical movement of the piston member. The regulator also includes damping means responsive to vertical movement of the piston member for developing a damping force on the piston member which opposes its movement to dampen oscillations of the piston within the pressure chamber. In addition, the regulator may include means responsive to the fluid flow between the reference supply and the system for rotating the piston about its vertical axis within the chamber to prevent cohesion between the piston member and the walls of the chamber as well as to reduce centralized build-up of contaminants which might interfere with the operation of the regulator.

In operation, the force of gravity acts upon the piston member as a reference force and opposes vertical movement of the piston. Regulation of the pressure in the system is provided when the pressure difference between the system and the reference supply, as acting on the enlarged surfaces of the piston member, is sufficient to produce an upward force greater than the force of gravity acting on the piston member. When this occurs the piston member moves upward within the chamber and allows a controlled amount of fluid to pass between the reference supply and the system. The piston member continues to move upward within the chamber to a point at which the volume of fluid flow equalizes the pressure differential and produces a balance of the vertical forces acting on the piston member. At this point the pressure within the system is at its regulated value and remains substantially constant under the control of the pressure regulator.

In particular, once the vertical forces on the piston member are balanced, any changes in pressure in the system are immediately reflected over the entire enlarged surfaces of the piston to produce a correcting force which functions to reposition the piston within the chamber such that the constant pressure is maintained in the system.

Thus, the pressure regulator of the present invention is highly stable and extremely sensitive even to small pressure changes in the pressure system. In addition, by employing a low force valve arrangement remote from the gravity reference regulating portion, the regulator of the present invention is not adversely affected by fluid flow passing through the valve arrangement between the reference supply and the system.

The above, as well as other features of the present invention, may be more clearly understood by reference to the following detailed description when considered with the drawings, in which:

FIGURE 1 is a cross-sectional representation of a basic form of the present invention; and FIGURE 2 is a perspective representation of a preferred form of the piston member of the present invention.

FIGURE 1 represents a design of the present invention for use with a vacuum system. As illustrated, the pressure regulator of the present invention includes means defining a pressure chamber 10. The means, by way of example, includes a vertically extending case 12 having a stepped bore arrangement 14 extending vertically within the case 12 from the upper end thereof about its longitudinal axis. The stepped bore arrangement 14 includes a large longitudinally extending bore 16, a central bore 18 and a relatively small inner bore 20 defining a recess 22 centrally disposed in the base of the chamber 10. To complete the chamber 10 and end cap member 24 abuts a flanged end portion 26 of the case and is coupled thereto by a plurality of screw members such as 28.

The case 12 includes a central port 32 which communicates both with the bore 16 and a vacuum pressure system (not specifically shown). In addition to the central port 32 the case 12 also includes a plurality of upper side ports such as 34 and 36 and a lower side port 38. The upper side ports communicate with the bore 16 and the atmosphere while the lower side port 38 communicates with the central bore 18 and the atmosphere.

Vertically mounted within the chamber 10 is a piston member 40. The piston member 40 has a predetermined weight and outer dimensions which are slightly smaller than the inner dimensions of adjacent portions of the chamber 10. In this manner fluid continuously leaks between the piston member 40 and the walls of the chamber 10 to effectively form a fluid-bearing contact between the piston member 40 and the walls of the chamber 10 as the piston member moves vertically within the chamber.

The piston member 40 includes an upper valve carrying portion 42, a stem 44 of reduced radial dimension, a solid large piston portion 46, and a small piston portion 48. The small piston 48 extends downward from the bottom of the large piston 46 and is dimensioned to extend vertically within the recess 22 in the base of the chamber 10. The small piston 48 also extends upward into the bore 18 opposite the side port 38.

The large piston 46 is dimensioned to extend vertically within the bore 18 and upward into the bore 16 and, as illustrated, divides the chamber 10 into effectively isolated upper and lower compartments 56 and 58, respectively. The upper compartment 56 includes the ports 32, 34 and 36 while the compartment 58 includes the port 38.

The large piston 46 includes upper and lower enlarged surfaces 50 and 52 which are continuously acted upon in opposite directions by fluids at the vacuum pressure in the system and at atmospheric pressure, respectively. The opposing fluid pressures create a pressure differential across the large piston 46 to produce a resultant vertical force which urges the piston member 40 upward within the chamber 10.

The valve carrying portion 42 extends from the neck 44 and takes the form of a cylinder 59 having a cylindrical valve surface 60 extending adjacent the ports 34 and 36. The valve surface 60 is shaped to normally impede fluid flow through the ports 34 and 36 and to allow a controlled volume of fluid flow in response to upward vertical movement of the piston members 40.

The valve carrying portion 42 also includes a plurality of holes 62, 64, 66 and 68 which define passages for fluid between opposite sides of the valve carrying member 42 within the compartment 56. Since fluid at the same pressure is free to flow through the openings in the valve carrying portion 42, like vertical forces are exerted on the upper and lower surfaces of the valve carrying portion 42, thereby resulting in a substantially zero vertical force being developed about the valve carrying portion 42.

The solid line indication of the piston member 40, as illustrated in FIGURE 1, represents the initial state of the piston member within the chamber 10. The broken line indication 68 represents a position assumed by the piston member 40 when the pressure regulator of the present invention is in use. Thus, in operating the force of gravity exerts a downward force on the piston member 40 to initially maintain the piston in a downward position with the small piston 48 resting against the base of the recess 22. The weight of the piston member 40 determines the lower limit of the range of pressures over which the regulator functions in that for a given weight of piston a predetermined minimum vertical force is required to raise the piston member within the chamber 10.

As the vacuum pressure within the vacuum system increases, the difference in fluid pressure exerted on the surfaces 50 and 52 of the large piston 46 increases. When the vacuum pressure in the system reaches a predetermined value, the pressure differential across the large piston 46 develops an upward vertical force on the large piston 46 which exceeds the downward gravitational force on the piston member 40 and the piston member 40 moves upward within the chamber 10. As the piston member moves upward within the chamber the valve carrying portion 42 moves to expose the compartment 56 to the atmosphere allowing fluid to enter the compartment 56 and pass through the port 32 to the vacuum system. The addition of fluid at atmospheric pressure reduces the vacuum pressure in the system until the vertical upward force on the piston 40 equals the downward force due to gravity. When this balance is achieved the pressure in the vacuum system is at its regulated value and is so maintained under the control of the pressure regulator of the present invention. For example, if a pressure change occurs in the vacuum system to increase the vacuum pressure a like change in pressure is immediately reflected over the entire upper surface 50 of the large piston 46. The change in pressure over the surface 50 produces a pressure differential across the large piston 46 and a resultant upward correcting force which moves the piston 40 further up within the chamber 10 to allow a greater volume of fluid to pass into the vacuum system. The increased volume of fluid flow at atmospheric pressure into the vacuum system reduces the vacuum pressure to the predetermined regulated value.

Since the upper and lower surfaces of the piston 46 are relatively large, the pressure regulator of the present invention is able to detect very small changes in pressure in the vacuum system and produce a relatively large correcting force to compensate for the changes in vacuum pressure. Thus, the pressure regulator of the present invention is highly sensitive—having a high ability to make a correction for small pressure changes in the vacuum system.

Since the mass of the piston member 40 is relatively large it possesses a high inertia. To prevent undesired oscillations of the piston member 40 within the chamber 10 during regulating operation, the regulator of the present invention includes damping means coupled to the piston member 40 and responsive to vertical movement thereof for developing a damping force which opposes the movement of the piston and damps all oscillations of the piston member within the chamber 10. In the basic form of the present invention, the damping means comprises the small piston 48 and the recess 22.

In operation, as the small piston 48 moves away from the end of the recess 22 with upward movement of the piston member 40, the volume of the fluid within the recess 22 is instantaneously increased. The sudden increase in volume creates a suction within the recess 22 and a force on the small piston 48 opposing its movement out of the recess. The force tends to buffer the initial movement of the piston member 40 to limit movement of the piston member 40 beyond a position necessary to provide the desired pressure correction.

Due to the spacing between the side walls of the recess 22 and the small piston 48, after the initial build-up of suction within the recess 22, fluid leaks into the recess to equalize the pressure therein and to terminate the downward force acting upon the small piston 48.

Since the fluid in the recess 22 is substantially incompressible, when the small piston then moves downward with the piston member 40 toward the end of the recess to compensate for reductions in vacuum pressure within the system, a pressure is instantaneously built-up within the recess 22 which produces an upward force opposing the downward movement of the piston member 40, thereby again buffering the movement of the piston. After the initial build-up of pressure within the recess 22 fluid leaks out of the recess to equalize the pressure therein and terminate the upward correcting force.

Thus, the damping means of the present invention is responsive to movement of the piston member 40 within the piston chamber 10 and is velocity and direction sensitive to stabilize the pressure regulator by limiting overshoot of the piston member 40 and by critically damping oscillations of the piston member while the pressure regulator is controlling the pressure in the vacuum system.

In view of this, the present invention provides not only an extremely sensitive pressure regulator but also one which is highly stable and free from undesired oscillations.

As previously described, due to the dimensional relationship between the piston member 40 and the inner walls of the chamber 10, fluid continuously flows over the surfaces of the piston to provide an effectively fluid-bearing contact between the piston and walls of the chamber which effectively reduces any friction drag between the piston and the walls of the chamber as the piston moves vertically therein. To further reduce friction and cohesion forces between the piston member 40 and the inner walls of the chamber 10, means may be provided adjacent the upper ports 34 and 36 for imparting rotary movement to the piston member 40 within the chamber in response to fluid flow through the ports 34 and 36. By way of example only, such means are illustrated in FIGURE 2 as including a pair of impeller blades 70 and 72 coupled to a collar 74 which is pinned about the neck 44 of the piston member 40.

The basic form of the present invention has been described in connection with a vacuum system. It is to be understood, however, that the pressure regulator of the present invention is equally applicable to a pressure system operating above atmospheric pressure by inverting the design of the present invention and by shaping the valve carrying member 42 such that upward vertical movement within the chamber 10 exposes the compartment 56 to atmospheric or some other reference pressure supply.

What is claimed is:
1. A pressure regulator, comprising:
   means defining a substantially vertically extending pressure chamber having a first port communicating with a pressure system to be regulated and second and third ports vertically spaced from each other for communicating with a reference pressure supply;
   a piston member of predetermined weight mounted within the pressure chamber for substantially vertical movement, the piston member having outer dimensions smaller than the inner dimensions of adjacent portions of the pressure chamber and including a solid end portion for dividing the pressure chamber into first and second substantially isolated compartments, the first compartment including the first and third ports and the second compartment including the second port, and a valve carrying portion defining a surface movable past the third port with movement of the piston member to vary the size of the opening to the second chamber for controlling the volume of fluid passage through the third port, in response to vertical movement of the piston member, the valve carrying portion including an opening for passing fluid to opposite sides of the valve carrying portion within the first chamber such that substantially zero vertical forces are developed on the piston member about the valve carrying portion;
   and damping means responsive to movement of the piston member for developing a damping force on the piston member which opposes the movement thereof to dampen oscillations of the piston member within the pressure chamber.

2. The apparatus defined in claim 1 including means for imparting rotary movement to the piston member within the pressure chamber in response to fluid flow through the third port.

3. A pressure regulator, comprising:
   means defining a substantially vertically extending pressure chamber having a first port communicating with a pressure system to be regulated, second and third ports vertically spaced from each other for communicating with a reference pressure supply, and a recess in an end surface of the chamber;
   a piston member of predetermined weight mounted within the pressure chamber for substantially vertical movement, the piston member having outer dimensions slightly smaller than the inner dimensions of adacent portions of the pressure chamber and including a solid end portion for dividing the pressure chamber into first and second substantially isolated compartments, the first compartment including the first and third ports and the second compartment including the second port, and a valve carrying portion defining a surface movable past the third port with movement of the piston member to vary the size of the opening to the second chamber for controlling a volume of fluid passage through the third port, in response to vertical movement of the piston member, the valve carrying portion including an opening for passing fluid to opposite sides of the valve carrying portion within the first chamber such that substantially zero vertical forces are developed on the piston member about the valve carrying portion;
   and damping means responsive to movement of the piston member for developing a damping force on the piston member which opposes the movement thereof including an arm member extending from an end of the piston member for substantially vertical movement with the piston member within the recess, said arm member having an outer dimension slightly smaller than the inner dimensions of the recess.

4. The apparatus defined in claim 3 including impeller blades coupled to the piston member adjacent the third port for imparting rotary movement to the piston member within the pressure chamber in response to fluid flow through the third port.

References Cited in the file of this patent
UNITED STATES PATENTS

| | | |
|---|---|---|
| 1,651,971 | Shield | Dec. 6, 1927 |
| 2,631,600 | Flanagan | Mar. 17, 1953 |
| 2,843,148 | Rymills | July 15, 1958 |
| 2,977,974 | Browne | Apr. 4, 1961 |
| 3,072,143 | Fleischhacker | Jan. 8, 1963 |